(12) United States Patent
Park et al.

(10) Patent No.: US 11,818,696 B2
(45) Date of Patent: Nov. 14, 2023

(54) TECHNIQUES FOR USER EQUIPMENT (UE)-AIDED SELECTIVE SINGLE FREQUENCY NETWORK (SFN) IN A WIRELESS COMMUNICATION SYSTEM

(71) Applicant: QUALCOMM Incorporated, San Diego, CA (US)

(72) Inventors: Sungwoo Park, Seoul (KR); Wooseok Nam, San Diego, CA (US); Tianyang Bai, Somerville, NJ (US); Kiran Venugopal, Raritan, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/224,864

(22) Filed: Apr. 7, 2021

(65) Prior Publication Data

US 2021/0321401 A1     Oct. 14, 2021

Related U.S. Application Data

(60) Provisional application No. 63/008,434, filed on Apr. 10, 2020.

(51) Int. Cl.
*H04W 72/0453* (2023.01)
*H04W 24/10* (2009.01)
*H04W 72/21* (2023.01)

(52) U.S. Cl.
CPC ....... *H04W 72/0453* (2013.01); *H04W 24/10* (2013.01); *H04W 72/21* (2023.01)

(58) Field of Classification Search
CPC . H04W 72/0453; H04W 24/10; H04W 72/21; H04B 7/0623; H04L 5/0051; H04L 1/06; H04L 1/0001
See application file for complete search history.

(56) References Cited

U.S. PATENT DOCUMENTS 11,553,489 B2 *  1/2023  Park ............... H04B 17/382
11,564,137 B2 *  1/2023  Ly ................... H04W 68/02
(Continued)

FOREIGN PATENT DOCUMENTS

KR    20070057642 A    6/2007
WO    2008077431 A1    7/2008

OTHER PUBLICATIONS

Eriksson M., "Dynamic Single Frequency Networks", IEEE Journal on Selected Areas in Communications, IEEE Service Center, Piscataway, US, vol. 19, No. 10, Oct. 2001 (Oct. 1, 2001), pp. 1905-1914, XP011055464, ISSN: 0733-8716, Sections II and IV.

(Continued)

*Primary Examiner* — Brian T O Connor
(74) *Attorney, Agent, or Firm* — Arun Swain

(57) ABSTRACT

This disclosure provides methods, devices and systems related to UE-aided selective single frequency network (SFN). In some implementations, a UE may obtain a first channel measurement of a first communication channel associated with a serving transmission and reception point (TRP), and a second channel measurement of a second communication channel associated with a neighbor TRP. The UE may further select an SFN condition associated with the first channel measurement or the second channel measurement, and transmit an indication including the SFN condition to one or both of the serving TRP or the neighbor TRP. In some other implementations, a network entity may select whether to configure a transmission scheme according to SFN for at least one of a serving TRP and a neighbor TRP associated with the SFN condition, and communicate with the UE associated with the transmission scheme according to SFN.

30 Claims, 8 Drawing Sheets

SFN for sub6G
w/o beamforming

SFN for millimeter wave
w/ analog beamforming

(56) References Cited

U.S. PATENT DOCUMENTS

| | | | |
|---|---|---|---|
| 11,617,200 B2* | 3/2023 | Venugopal | H04W 72/53 370/329 |
| 2013/0156001 A1 | 6/2013 | Gomadam | |
| 2020/0389883 A1* | 12/2020 | Faxér | H04L 5/0053 |
| 2021/0328742 A1* | 10/2021 | Hao | H04B 7/0634 |
| 2021/0368477 A1* | 11/2021 | Park | H04W 56/001 |
| 2022/0167393 A1* | 5/2022 | Singh | H04W 72/23 |

OTHER PUBLICATIONS

International Search Report and Written Opinion—PCT/US2021/026410—ISA/EPO—dated Jul. 12, 2021.

Maattanen H-L., et al., "System-Level Performance of LTE-Advanced with Joint Transmission and Dynamic Point Selection Schemes", EURASIP Journal on Advances in Signal Processing, Nov. 1, 2012 (Nov. 1, 2012), pp. 1-18, XP055232272, p. 1, New York, DOI: 10.1186/1687-6180-2012-247, Retrieved from the Internet: URL: http://www.asp.eurasipjournals.com/content/pdf/1687-6180-2012-247.pdf p. 1-p. 3, p. 7-p. 8.

* cited by examiner

TECHNIQUES FOR USER EQUIPMENT (UE)-AIDED SELECTIVE SINGLE FREQUENCY NETWORK (SFN) IN A WIRELESS COMMUNICATION SYSTEM

CROSS-REFERENCE TO RELATED APPLICATION(S)

This application claims the benefit of U.S. Provisional Patent Application No. 63/008,434, entitled "TECHNIQUES FOR USER EQUIPMENT (UE)-AIDED SELECTIVE SINGLE FREQUENCY NETWORK (SFN) IN A WIRELESS COMMUNICATION SYSTEM" and filed on Apr. 10, 2020, which is expressly incorporated by reference herein in its entirety.

TECHNICAL FIELD

Aspects of the present disclosure relate generally to wireless communication systems, and more particularly, to user equipment (UE)-aided selective single frequency network (SFN) techniques.

DESCRIPTION OF THE RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at an apparatus of a user equipment (UE) including obtaining a first channel measurement of a first communication channel associated with a serving transmission and reception point (TRP), obtaining a second channel measurement of a second communication channel associated with a neighbor TRP, selecting a single frequency network (SFN) condition associated with the first channel measurement or the second channel measurement, the SFN condition indicates a preference for SFN communication or a modification of an SFN parameter, and transmitting an indication including the SFN condition to one or both of the serving TRP and the neighbor TRP.

Another implementation of the subject matter described in this disclosure can be implemented in an apparatus for wireless communication. The apparatus may include memory including instructions and a processor in communication with the memory to execute the instructions to obtain a first channel measurement of a first communication channel associated with a serving TRP. The processor may further configured be to obtain a second channel measurement of a second communication channel associated with a neighbor TRP. The processor may further configured be to select a SFN condition associated with the first channel measurement or the second channel measurement, the SFN condition indicates a preference for SFN communication or a modification of an SFN parameter. The processor may further configured be to transmit an indication including the SFN condition to one or both of the serving TRP and the neighbor TRP.

A further implementation of the subject matter described in this disclosure can be implemented in an apparatus for wireless communication. The apparatus may include means for obtaining a first channel measurement of a first communication channel associated with a serving TRP, means for obtaining a second channel measurement of a second communication channel associated with a neighbor TRP, means for selecting a SFN condition associated with the first channel measurement or the second channel measurement, the SFN condition indicates a preference for SFN communication or a modification of an SFN parameter, and means for transmitting an indication including the SFN condition to one or both of the serving TRP and the neighbor TRP.

Another implementation of the subject matter described in this disclosure can be implemented in a non-transitory computer-readable medium including stored instructions of communications, executable by a processor to obtain a first channel measurement of a first communication channel associated with a serving TRP, obtain a second channel measurement of a second communication channel associated with a neighbor TRP, select a SFN condition associated with the first channel measurement or the second channel measurement, the SFN condition indicates a preference for SFN communication or a modification of an SFN parameter, and transmit an indication including the SFN condition to one or both of the serving TRP and the neighbor TRP.

Another example implementation includes a method of wireless communication at an apparatus of a network entity including receiving an indication including a SFN condition from UE, selecting whether to configure a transmission scheme according to SFN for at least one of a serving TRP and a neighbor TRP associated with the SFN condition, and communicating with the UE in accordance with the transmission scheme.

Another implementation of the subject matter described in this disclosure can be implemented in an apparatus for wireless communication. The apparatus may include memory including instructions and a processor in communication with the memory to execute the instructions to receive an indication including a SFN condition from UE. The processor may further be configured to select whether to configure a transmission scheme according to SFN for at least one of a serving TRP and a neighbor TRP associated with the SFN condition. The processor may further be configured to communicate with the UE in accordance with the transmission scheme.

A further implementation of the subject matter described in this disclosure can be implemented in an apparatus for wireless communication. The apparatus may include means for receiving an indication including a SFN condition from UE, means for selecting whether to configure a transmission scheme according to SFN for at least one of a serving TRP and a neighbor TRP associated with the SFN condition, and means for communicating with the UE in accordance with the transmission scheme.

Another implementation of the subject matter described in this disclosure can be implemented in a non-transitory computer-readable medium including stored instructions of communications, executable by a processor to receive an indication including a SFN condition from UE, select whether to configure a transmission scheme according to SFN for at least one of a serving TRP and a neighbor TRP associated with the SFN condition, and communicate with the UE in accordance with the transmission scheme.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Like reference numbers and designations in the various drawings indicate like elements.

DETAILED DESCRIPTION

Figure 1:
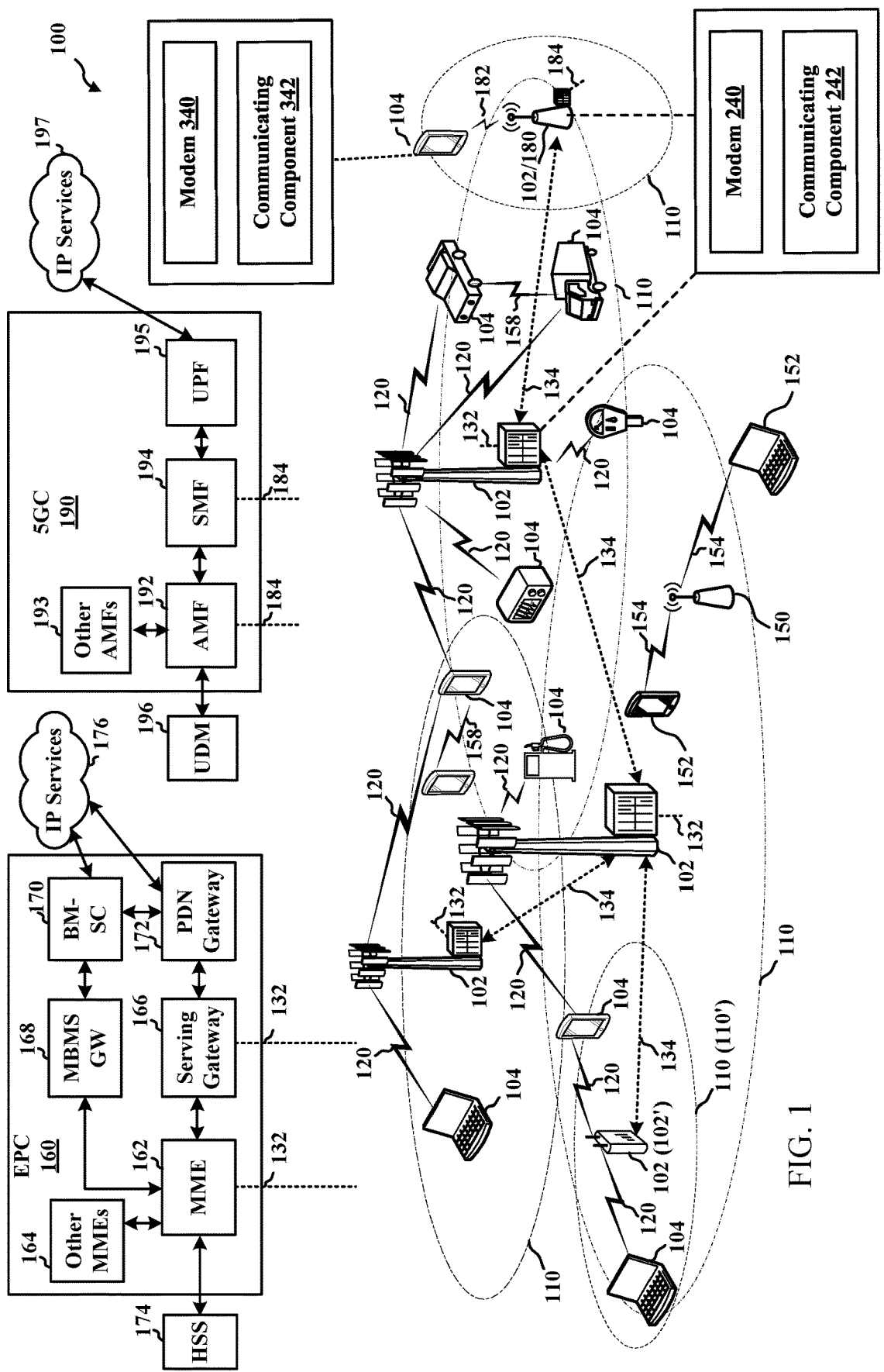
FIG. 1 illustrates an example of a wireless communication system.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The described features generally relate to a UE-aided selective single frequency network (SFN). Specifically, a SFN is a communication network where multiple transmission and reception points (TRPs) may substantially simultaneously or concurrently transmit a similar signal (or data) over the same frequency channel. In some scenarios, the SFN may not result in improved data communications due to diverging phases of signals of multiple TRPs transmitting the same data on the same frequency/time resources. As such, proactively determining at a UE whether the SFN may result in improved data transmissions, and informing the network (such as a gNB node in the network) may be desirable.

The present disclosure includes a method, apparatus, and non-statutory computer readable medium for wireless communications at a UE including obtaining a first channel measurement of a first communication channel associated with a serving TRP, obtaining a second channel measurement of a second communication channel associated with a neighbor TRP, selecting a SFN condition associated with the first channel measurement and the second channel measurement, and transmitting an indication including the SFN condition to one or both of the serving TRP and the neighbor TRP. In some implementations, selecting an SFN condition can include determining, identifying, or detecting the SFN condition. For instance, the SFN condition may indicate a preference of the UE to communicate via or using SFN, or a request for modifying an SFN parameter (such as a transmit delay) to perform improved SFN communications. By doing so, the UE can efficiently request/modify SFN operation based on the channel conditions (such as prefer SFN when channel conditions are favorable and not prefer SFN when channel conditions are unfavorable).

The present disclosure also includes a method, apparatus, and non-statutory computer readable medium for wireless communications at a network entity including receiving an indication including a SFN condition from a UE, selecting whether to configure a transmission scheme according to SFN for at least one of a serving TRP and a neighbor TRP associated with the SFN condition, and communicating with the UE in accordance with the transmission scheme. For example, the network entity may configure the transmission scheme according to SFN when the SFN condition indicates that SFN operation would result in improved transmissions between the network entity and the UE (such as the channel conditions are favorable as determined by the UE). On the other hand, the network entity may not configure the transmission scheme according to SFN when the SFN condition indicates that SFN operation would not result in improved transmissions between the network entity and the UE (such as the channel conditions are unfavorable as determined by the UE).

Particular implementations of the subject matter described in this disclosure can be implemented to realize one or more of the following potential advantages. SFN operation between a UE and multiple TRPs (such as of an gNB) may ensure that SFN occurs when phases of signals of multiple TRPs transmitting the same data on the same frequency/time resources are aligned. Further, proactively determining at a UE whether an SFN may result in improved data transmissions may mitigate SFN events that result in signal loss. Additionally, the UE may detect channels from both serving and neighbor TRPs, and may determine how to improve the SFN performance (such as applying different transmission delays or, equivalently, phase shift), and reporting the determination to the gNB, which may result in SFN performance improvement.

Furthermore, using an SFN condition indication may reduce signaling overhead. Specifically, since the UE may have better observation of the active or connected channel, the UE may make improved determinations or selections of SFN parameters. Conversely, if TRPs attempt a similar procedure or request similar SFN parameter information, the UE may provide feedback of the measured channels to the TRPs, which may result in higher feedback overhead. In another example, by using SFN selectively, the UE may improve service such as communicate using higher data rates. Also, from a network perspective, SFN may reduce interference between UEs served by different TRPs, and thus may increase system throughput.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include gNBs 180, as described further herein.

In one example, some nodes such as base station 102/gNB 180, may have a modem 240 and communicating component 242 for receiving an indication including a SFN condition from a UE, determining whether to configure a transmission scheme according to SFN for at least one of a serving TRP and a neighbor TRP based on the SFN condition, and communicating with the UE based on determining whether to configure the transmission scheme according to SFN, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for obtaining a first channel measurement of a first communication channel associated with a serving TRP, obtaining a second channel measurement of a second communication channel associated with a neighbor TRP, determining a SFN condition based on the first channel measurement and the second channel measurement, and transmitting an indication including the SFN condition to one or both of the serving TRP or the neighbor TRP, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 3:
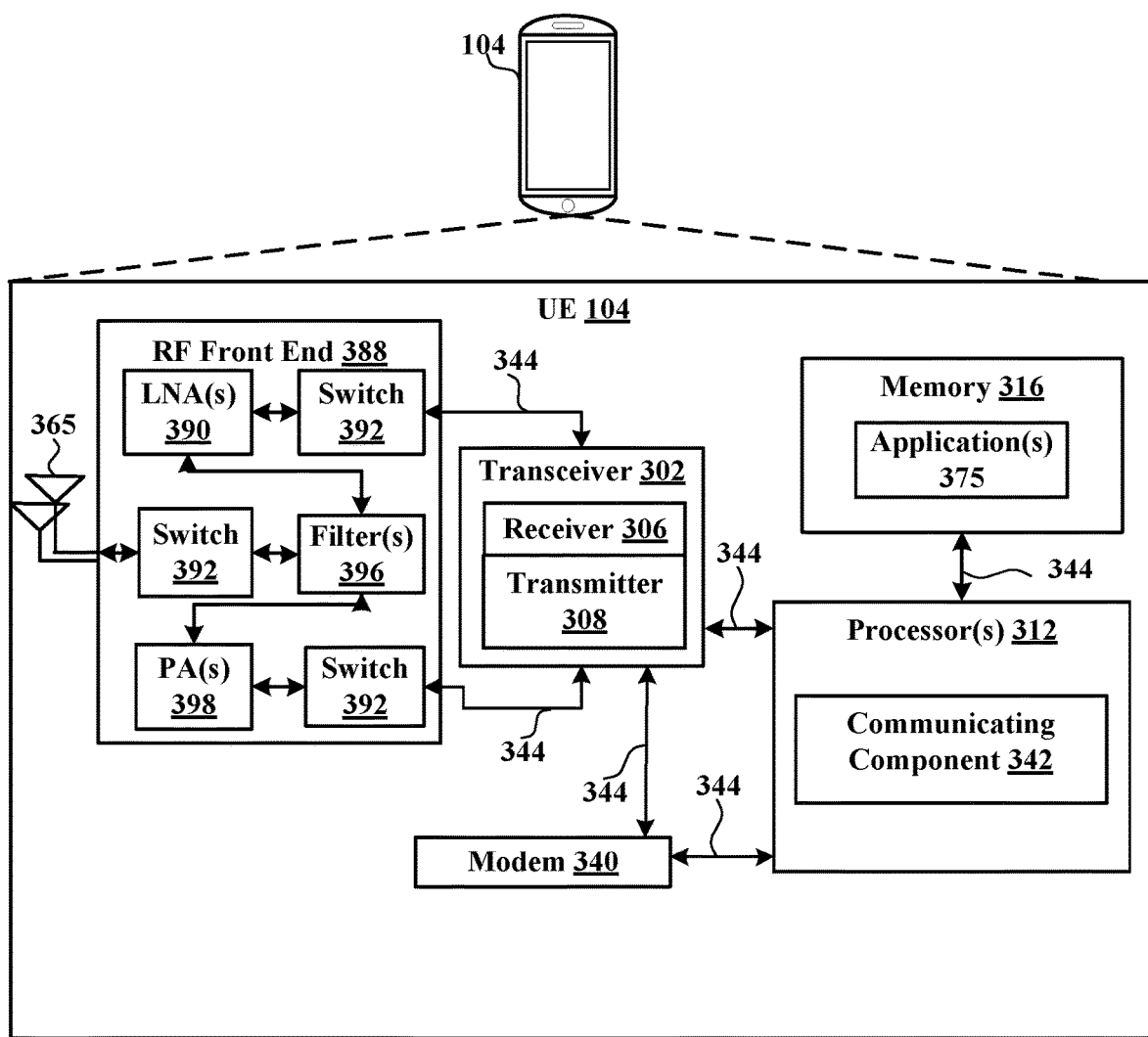
FIG. 3 is a block diagram illustrating an example of a user equipment (UE).
Figure 4A:
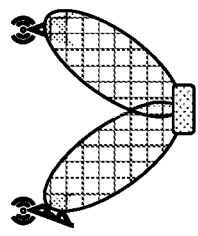
FIG. 4A is an example representation of a single frequency network (SFN) with beamforming and without beamforming.
Figure 4A:
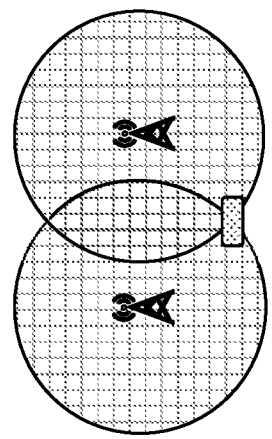
Figure 4B:
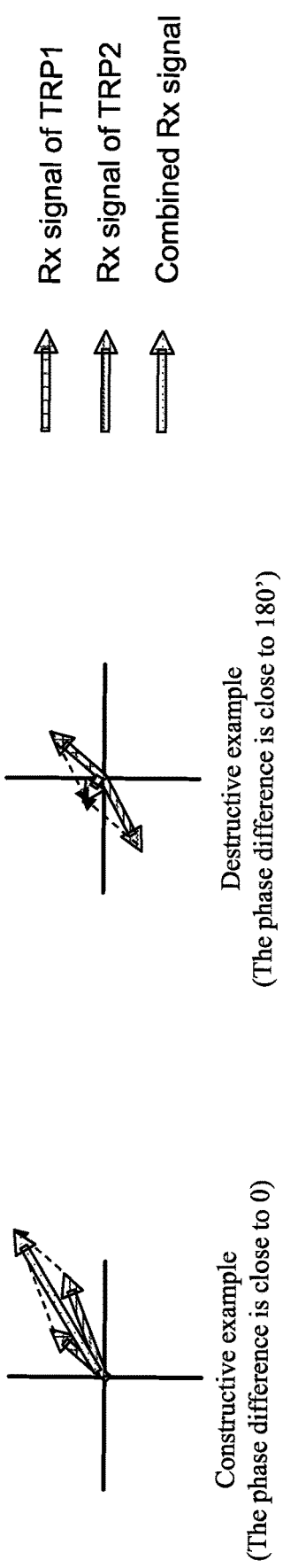
FIG. 4B is a graphical example representation of a constructive SFN scenario and a destructive SFN scenario.
Figure 5:
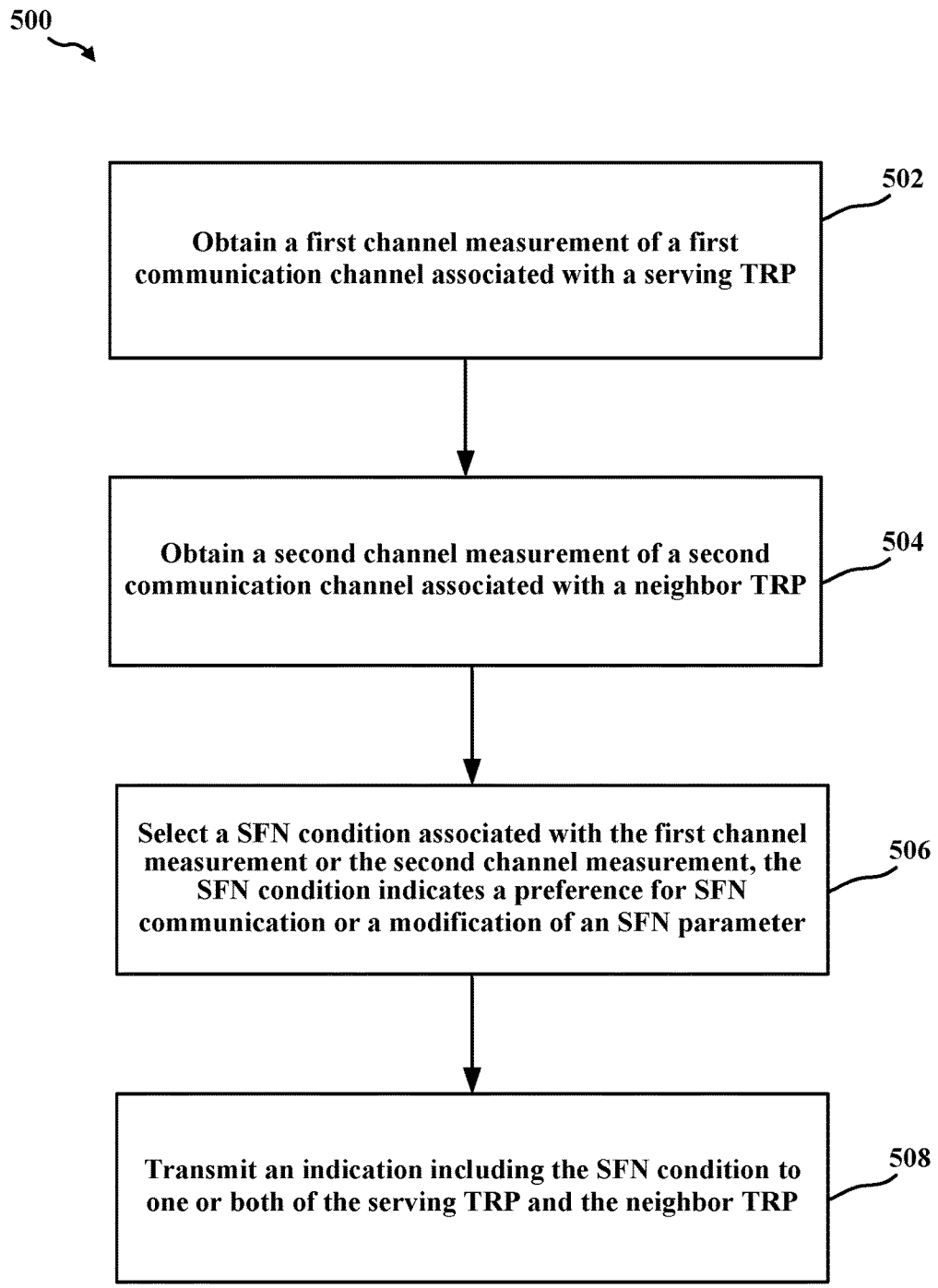
FIG. 5 is a flowchart of an example method of wireless communication at an apparatus of a UE.
Figure 6:
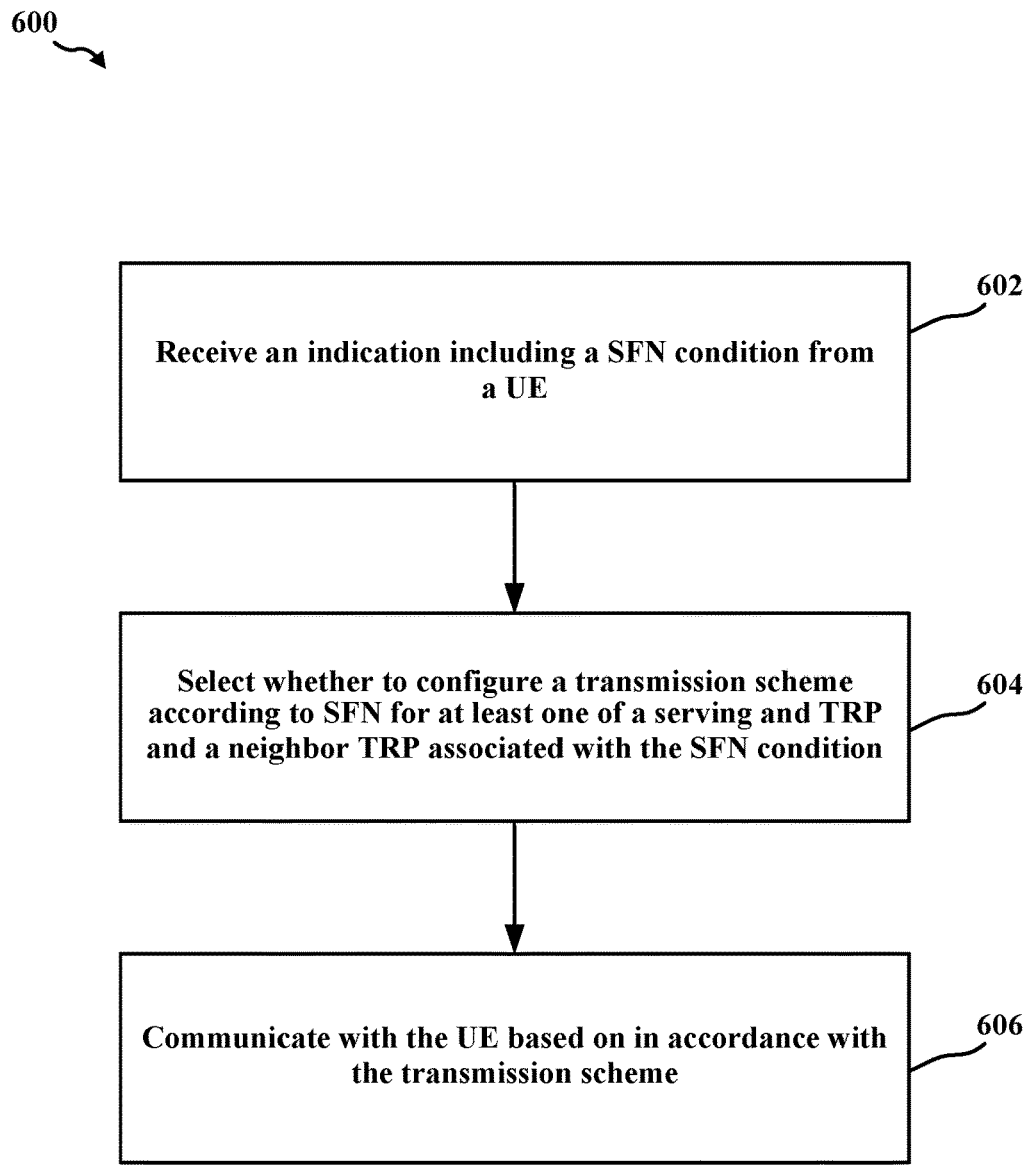
FIG. 6 is a flowchart of another example method of wireless communication at an apparatus of a network entity.

Turning now to FIGS. 2-7, aspects are depicted with reference to one or more components and one or more methods that may perform the actions or operations described herein, where aspects in dashed line may be optional. Although the operations described below in FIGS. 5 and 6 are presented in a particular order or as being performed by an example component, it should be understood that the ordering of the actions and the components performing the actions may be varied, depending on the implementation. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
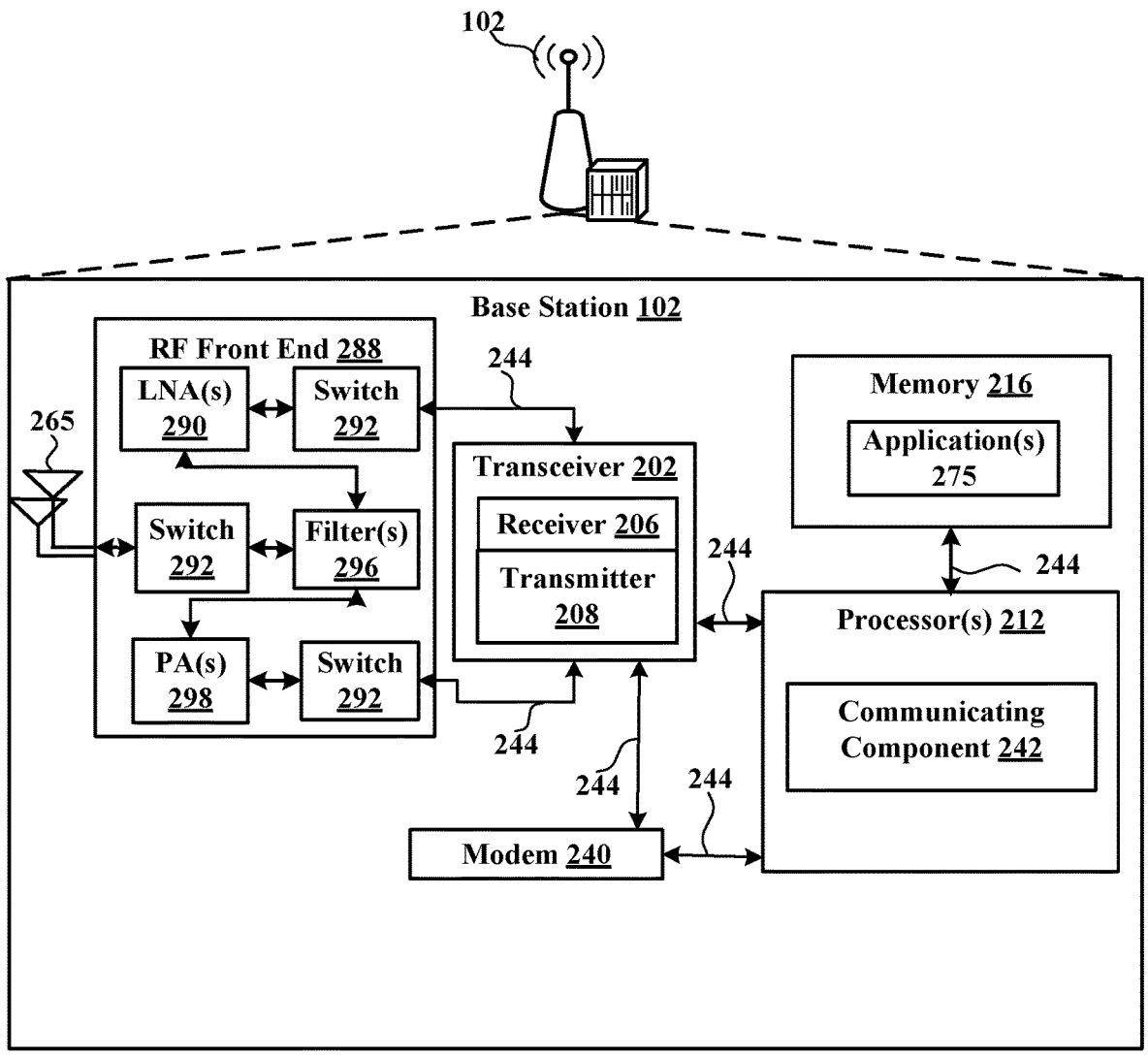
FIG. 2 is a block diagram illustrating an example of a network entity (also referred to as a base station (BS)).

FIG. 2 is a block diagram illustrating an example of a network entity (also referred to as a base station). The base station 102 (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for UE-aided selective SFN.

In some implementations, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver.

In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

FIG. 3 is a block diagram illustrating an example of a user equipment (UE) 104. The UE 104 may include a variety of components, some of which have already been described above and are described further herein, including components such as one or more processors 312 and memory 316 and transceiver 302 in communication via one or more buses 344, which may operate in conjunction with modem 340.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

FIG. 4A is an example representation of a single frequency network (SFN) with beamforming 402 and without beamforming 400. Beamforming permits multiple antennas to control a direction of a wave-front by appropriately weighting the magnitude and phase of individual antenna signals in an array of multiple antennas. SFN may be one of a number of multi-TRP techniques where multiple TRPs transmit the same data on the same frequency and time resources. Specifically, SFN without beamforming 400 may include multiple TRPs transmitting similar or otherwise identical data on similar frequencies to at least one UE without beamforming for sub-6 GHz bands (such as LTE or NR frequency range 1 (i.e., FR1)). On the other hand, SFN with beamforming 402 is shown to directional control the beams from each TRP towards a receiver such as a UE for millimeter wave bands (such as NR frequency range 2 (i.e., FR2)).

FIG. 4B is a graphical example representation of a constructive SFN scenario 420 and a destructive SFN scenario 422. SFN may result in a power gain as the signal from the serving TRP and the neighbor TRP are combined over the air. However, in other scenarios, SFN may result in a negative gain (i.e., loss) as over-the-air channel combining can effectively be either constructive or destructive. In the constructive SFN scenario 420, a phase difference between two of the same signals is close to or at 0°, whereas in the destructive SFN scenario 422, a phase difference between two of the same signals is close to or at 180°.

SFN may result in degraded communication quality when a number of conditions are satisfied. First, both links from the serving TRP and the neighbor TRP have one dominant channel path, i.e., line-of-sight (LOS) channel. Second, the channel paths from the serving TRP and the neighbor TRP may arrive at the same time. For example, the distance from the serving TRP and the UE may be similar to the distance from the dominant TRP and the UE. In one scenario, the serving TRP and the neighbor TRP may be different sectors of the same gNB.

If the above conditions are met, all the subcarriers over frequency may experience the same effect (i.e., either constructive or destructive) because the channel is frequency flat. For example, all the subcarriers in the assigned resource block (RB) may experience the constructive effect at some time $t_1$, and the destructive effect at some time $t_2$. This fluctuation over time can make SFN performance worse than not engaging in SFN in spite of the power gain. Further, if there are multiple paths in both links and the paths arrive at different times, the constructive and destructive effect can be averaged out over frequency and thus SFN may be beneficial due to power gain.

To address the potential for poor SFN performance, in one implementation, the UE can identify whether engaging in SFN transmissions may result in improved performance and provide an indication to the network. Specifically, the UE may determine whether to use SFN or not based on channel measurements and report the measurements to a gNB. Based on the UE report, the gNB may determine whether to use SFN when communicating with the UE.

For example, the UE determines whether to use SFN by initially monitoring a synchronization signal block (SSB) of the serving TRP and the neighbor TRP(s). Based on the SSBs, the UE estimates the channel impulse response of each link (i.e., serving TRP and neighbor TRP). Specifically, the UE may determine a number of dominant channel paths and the arrival time of the channel paths. If a number of dominant channel paths is the same for both links, and the paths of the two links arrive in a similar range (i.e., within a threshold microseconds (us)), the UE may determine to request the gNB not to use SFN. Alternatively, if the number of dominant channel paths is not the same for both links, or the paths of the two links do not converge in a similar range, the UE may transmit a request to the gNB requesting SFN based communication.

The UE may report the determination of SFN communication preference to the gNB. The UE may report the determination of SFN preference to the serving TRP. Alternatively, UE can report the determination of SFN preference to the serving and neighbor TRPs. The report can be sent via uplink control information (UCI), medium access control (MAC) control element (MAC-CE), or radio resource control (RRC). Based on the UE report, the gNB may determine whether to use SFN for the UE. The gNB uses SFN for the UEs that report an indicated preference to use SFN.

In another implementation, the UE may determine the modification of SFN transmissions based on channel measurements, and report the determined modification to the gNB. Based on the UE report, the gNB may modify the SFN-related transmission parameters. Specifically, the UE may determine if the current channels are suitable for SFN transmission. If not, the UE may determine improvements for SFN. For instance, the UE may monitor the SSB of the serving TRP and the neighbor TRP(s).

Based on the SSBs, the UE estimates the channel impulse response of each link, such as a number of dominant channel paths, and the arrival time of the channel paths. If the number of dominant channel paths is the same for both links and the paths of the two links arrive in a similar range (such as within a threshold time value), the UE may determine to request the gNB apply at least one different delay across TRPs.

Further, the UE reports the modification determination of SFN transmission to the gNB. The UE may report the modification determination decision to the serving TRP. Alternatively, the UE may report the modification determination to the serving and neighbor TRPs. The report may be sent via UCI, MAC-CE, or RRC. Based on the UE report, the gNB may modify the SFN-transmission parameters for the UE. For example, the gNB may apply different delays to different TRPs in the SFN transmission in order to make the arrival times at the UE different.

FIG. 5 is a flowchart of an example method 500 of wireless communication at an apparatus of a UE. In an example, a UE 104 can perform the functions described in method 500 using one or more of the components described in FIGS. 1, 3 and 7.

At block 502, the method 500 may obtain a first channel measurement of a first communication channel associated with a serving TRP. In some implementations, the communicating component 342, such as in conjunction with processor(s) 312, memory 316, or transceiver 302, may be configured to obtain a first channel measurement (such as a channel impulse response) of a first communication channel associated with a serving TRP. Thus, the UE 104, the processor(s) 312, the communicating component 342 or one of its subcomponents may define the means for obtaining a first channel measurement of a first communication channel associated with a serving TRP. For example, to obtain the first channel measurement of the first communication channel, the processor 312 of the UE 104 may activate the transceiver 302 and associated RF front end 388 components to perform measurements on the first communication channel.

At block 504, the method 500 may obtain a second channel measurement of a second communication channel associated with a neighbor TRP. In some implementations, the communicating component 342, such as in conjunction with processor(s) 312, memory 316, or transceiver 302, may be configured to obtain a second channel measurement (such as a channel impulse response) of a second communication channel associated with a neighbor TRP. Thus, the UE 104, the processor(s) 312, the communicating component 342 or one of its subcomponents may define the means for obtaining a second channel measurement of a second communication channel associated with a neighbor TRP. For example, to obtain the second channel measurement of the second communication channel, the processor 312 of the UE 104 may activate the transceiver 302 and associated RF front end 388 components to perform measurements on the second communication channel.

In some implementations, the method 500 may include monitoring a first reference signal of the serving TRP, and monitoring a second reference signal of the neighbor TRP. In some implementations, the communicating component 342, such as in conjunction with processor(s) 312, memory 316, or transceiver 302, may be configured to monitor a first reference signal of the serving TRP, and monitoring a second reference signal of the neighbor TRP. Thus, the UE 104, the processor(s) 312, the communicating component 342 or one of its subcomponents may define the means for monitoring a first reference signal of the serving TRP, and monitoring a second reference signal of the neighbor TRP. In some implementations, obtaining the first channel measurement may include determining a first channel impulse response based on the first SSB, and obtaining the second channel measurement includes determining a second channel impulse response based on the second SSB.

In some implementations, the first reference signal and second reference signal may correspond to one of a SSB, a channel station information (CSI) reference signal (RS), or a demodulation reference signal (DMRS).

At block 506, the method 500 may select a SFN condition associated with the first channel measurement and the second channel measurement. In some implementations, the communicating component 342, such as in conjunction with processor(s) 312, memory 316, or transceiver 302, may be configured to select a SFN condition associated with the first channel measurement and the second channel measurement. Thus, the UE 104, the processor(s) 312, the communicating component 342 or one of its subcomponents may define the means for selecting a single frequency network (SFN) condition associated with the first channel measurement and the second channel measurement. For example, using both the channel measurements, the processor 312 of the UE 104 may, in conjunction with one or more applications 375 residing at the memory 316, may select the SFN condition indicating a preference for SFN communication or a modification of an SFN parameter.

In some implementations, the SFN condition may indicate a preference of the UE to communicate via or using SFN, or a request for modifying an SFN parameter (such as transmit delay) to perform improved SFN communications.

At block 508, the method 500 may transmit an indication including the SFN condition to one or both of the serving TRP and the neighbor TRP. In some implementations, the communicating component 342, such as in conjunction with processor(s) 312, memory 316, or transceiver 302, may be configured to transmit an indication including the SFN condition to one or both of the serving TRP and the neighbor TRP. Thus, the UE 104, the processor(s) 312, the communicating component 342 or one of its subcomponents may define the means for transmitting an indication including the SFN condition to one or both of the serving TRP and the neighbor TRP. For example, the processor 312 of the UE 104 may activate the transceiver 302 and associated RF front end 388 components to transmit an indication including the SFN condition to one or both of the serving TRP or the neighbor TRP.

In some implementations, the indication may correspond to a single bit that indicates whether to use SFN or not.

In some implementations, the indication may correspond to a single bit that indicates whether to apply a transmission delay (such as a transmission delay can be deterministic and known to the gNB, or the gNB may apply a random delay).

In some implementations, the indication may correspond to a number of bits that indicate an exact value of a transmission delay (such as the UE deciding the value of the transmission delay, instead of the network).

In some implementations, the method 500 may include receiving, from the serving TRP and a neighbor TRP, data within a single frequency in response to transmitting the indication. In some implementations, the communicating component 342, such as in conjunction with processor(s) 312, memory 316, or transceiver 302, may be configured to receive, from the serving TRP and a neighbor TRP, data within a single frequency in response to transmitting the indication. Thus, the UE 104, the processor(s) 312, the communicating component 342 or one of its subcomponents may define the means for receiving, from the serving TRP and a neighbor TRP, data within a single frequency in response to transmitting the indication.

In some implementations, determining the SFN condition may include identifying that a number of channel paths for the first communication channel is equal to a number of channel paths for the second communication channel, and determining that the number of channel paths for the first communication channel and the number of channel paths for the second communication channel fall within a threshold range. In some implementations, the indication may be transmitted based on identifying that the number of channel paths for the first communication channel is equal to the number of channel paths for the second communication channel and determining that the number of channel paths for the first communication channel and the number of channel paths for the second communication channel fall within the threshold range.

In some implementations, the SFN condition may correspond to a request for one or both of the serving TRP or the neighbor TRP not to use an SFN based communication.

In some implementations, the SFN condition may correspond to a request for one or both of the serving TRP or the neighbor TRP to apply a transmit delay.

In some implementations, the indication may correspond to one of UCI, a MAC-CE, or a RRC message.

The UE may send the indication to one or both of the serving TRP or neighbor TRP based on an SFN application with respect to the TRPs. In some implementations, if the serving TRP is set as a master TRP and determines whether to use SFN or not, the UE may send the report to the serving TRP. The serving TRP may make a decision on whether to use SFN and send the decision to the neighbor TRP via backhaul. In some other implementations, the neighbor TRP may independently determine whether to participate in SFN or not upon receiving the report from the UE. In this case, the UE may send the report to the serving TRP as well as the neighbor TRP for link adaptation (i.e., the serving TRP may determine the best modulation and coding scheme (MCS) level depending on whether SFN is used or not).

FIG. 6 is a flowchart of another example method 600 for wireless communication at an apparatus of a network entity. In an example, a base station 102 can perform the functions described in method 600 using one or more of the components described in FIGS. 1, 2 and 7.

At block 602, the method 600 may receive an indication including a SFN condition from a UE. In some implementations, the communicating component 242, such as in conjunction with processor(s) 212, memory 216, or transceiver 202, may be configured to receive an indication including a SFN condition from a UE. Thus, the base station 102, the processor(s) 212, the communicating component 242 or one of its subcomponents may define the means for receiving an indication including a SFN condition from a UE. For example, the processor 212 of the base station 102 may activate the transceiver 202 and associated RF front end 288 components to receive an indication including a SFN condition from a UE.

In some implementations, the SFN condition may indicate a preference of the UE to communicate via or using SFN, or a request for modifying an SFN parameter (such as transmit delay) to perform improved SFN communications. Further, in some implementations, the apparatus receiving the indication may be a serving/neighbor TRP.

In some implementations, the SFN condition may correspond to a request not to use SFN based communication.

In some implementations, the SFN condition may correspond to a request to apply a transmission delay.

In some implementations, the indication may be received at the serving TRP.

In some implementations, the indication may be received at the neighbor TRP.

In some implementations, the indication may correspond to one of UCI, a MAC-CE, or a RRC message.

In some implementations, the indication corresponds to one of UCI, a MAC CE, or a RRC message.

At block 604, the method 600 may select whether to configure a transmission scheme according to SFN for at least one of a serving TRP and a neighbor TRP associated with the SFN condition. In some implementations, the communicating component 242, such as in conjunction with processor(s) 212, memory 216, or transceiver 202, may be configured to select whether to configure a transmission scheme according to SFN for at least one of a serving TRP and a neighbor TRP associated with the SFN condition (such as the gNB may determine whether to use SFN transmission or not, or whether to apply the transmission delay or not, based on the UE report corresponding to the SFN condition). Thus, the base station 102, the processor(s) 212, the communicating component 242 or one of its subcomponents may define the means for select whether to configure a transmission scheme according to SFN for at least one of a serving TRP and a neighbor TRP associated with the SFN condition. For example, using the SFN condition (i.e., indication from the UE as to SFN preference), the processor 312 of the UE 104 may, in conjunction with one or more applications 375 residing at the memory 316, may select whether to configure a transmission scheme according to SFN for at least one of a serving TRP and a neighbor TRP.

In an implementation, determining whether to configure the transmission scheme according to SFN is done by a serving TRP or a neighbor TRP, such as the one that received the indication.

At block 606, the method 600 may communicate with the UE in accordance with the transmission scheme. In some implementations, the communicating component 242, such as in conjunction with processor(s) 212, memory 216, or transceiver 202, may be configured to communicate with the UE in accordance with the transmission scheme corresponding to SFN. Thus, the base station 102, the processor(s) 212, the communicating component 242 or one of its subcomponents may define the means for communicating with the UE in accordance with the transmission scheme. In some implementations, the configuration may correspond to turning on (or off) SFN or modifying existing SFN parameters, thereby allowing a UE to efficiently request SFN when conditions are favorable for such communication. For instance, the processor 212 of the base station 102 may activate the transceiver 202 and associated RF front end 288 components to communicate with the UE according to the SFN preference.

Figure 7:
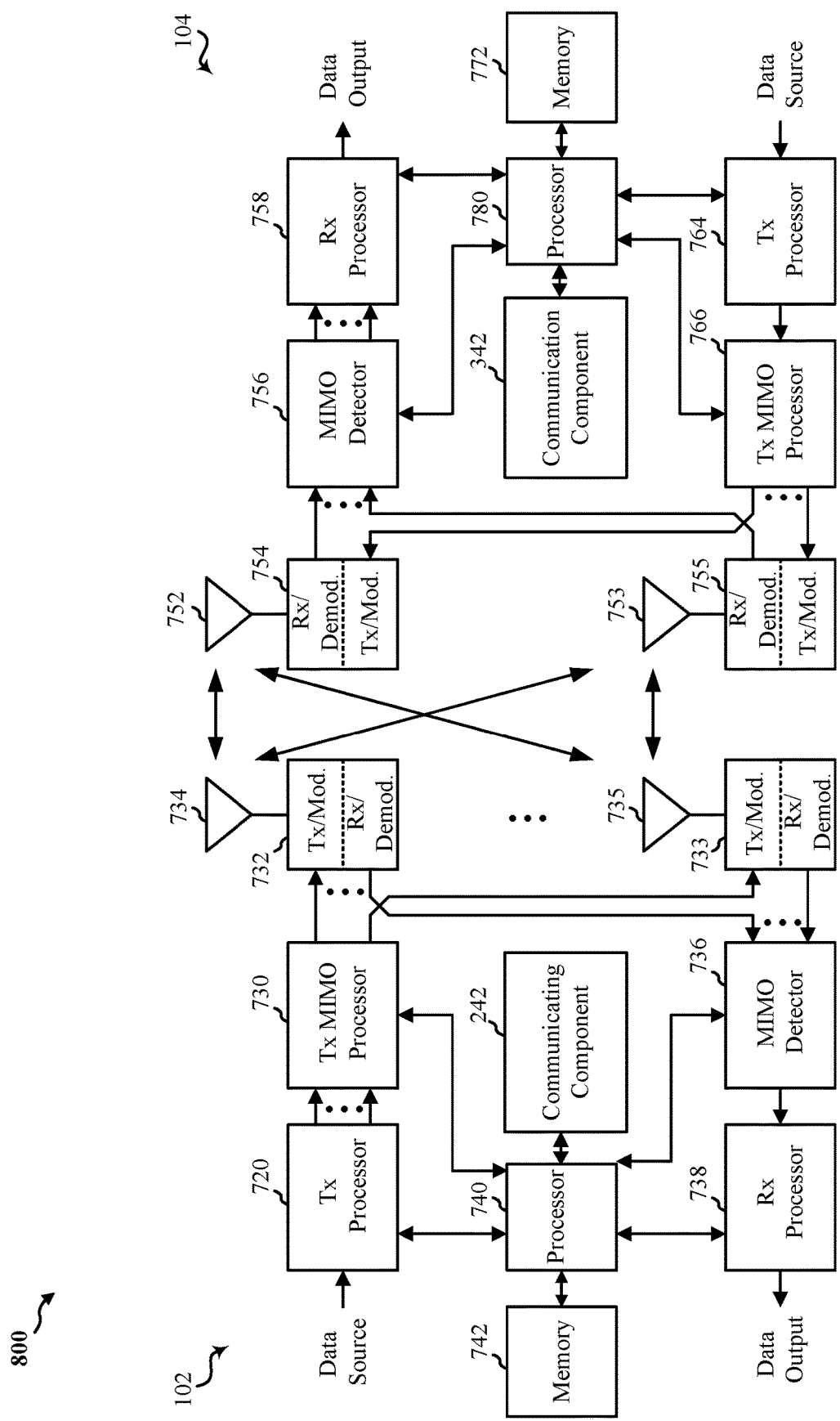
FIG. 7 is a block diagram illustrating an example of a MIMO communication system including a BS and a UE.

FIG. 7 is a block diagram of a MIMO communication system 700 including a base station (BS) 102 and a UE 104. The MIMO communication system 700 may be configured to implement the user equipment-aided selective single frequency network techniques described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (such as FIGS. 1 and 2).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

SOME ADDITIONAL EXAMPLES

The implementations described herein additionally include one or more of the following implementation examples described in the following numbered clauses.

1. A method of communications at an apparatus of a user equipment (UE), including:
obtaining a first channel measurement of a first communication channel associated with a serving transmission and reception point (TRP);
obtaining a second channel measurement of a second communication channel associated with a neighbor TRP;
selecting a single frequency network (SFN) condition associated with the first channel measurement or the second channel measurement, where the SFN condition indicates a preference for SFN communication or a modification of an SFN parameter; and
transmitting an indication including the SFN condition to one or both of the serving TRP and the neighbor TRP.

2. The method of clause 1, further including:
monitoring a first reference signal of the serving TRP; and
monitoring a second reference signal of the neighbor TRP;
where obtaining the first channel measurement includes determining a first channel impulse response based on the first reference signal; and
where obtaining the second channel measurement includes determining a second channel impulse response based on the second reference signal.

3. The method of any preceding clause, where the first reference signal and second reference signal correspond to one of:
a synchronization signal block (SSB),
a channel station information (CSI) reference signal (RS), or
a demodulation reference signal (DMRS).

4. The method of any preceding clause, where determining the SFN condition includes:
identifying that a number of channel paths for the first communication channel is equal to a number of channel paths for the second communication channel; and
determining that the number of channel paths for the first communication channel and the number of channel paths for the second communication channel fall within a threshold range,
where the indication is transmitted based on identifying that the number of channel paths for the first communication channel is equal to the number of channel paths for the second communication channel and determining that the number of channel paths for the first communication channel and the number of channel paths for the second communication channel fall within the threshold range.

5. The method of any preceding clause, where the preference for SFN communication corresponds to a request for one or both of the serving TRP or the neighbor TRP not to use an SFN based communication.

6. The method of any preceding clause, where the preference for SFN communication corresponds to a request for one or both of the serving TRP or the neighbor TRP to use an SFN based communication.

7. The method of any preceding clause, where the modification of the SFN parameter includes a request for one or both of the serving TRP or the neighbor TRP to apply a transmit delay.

8. The method of any preceding clause, where the indication corresponds to one of:
uplink control information (UCI),
a medium access control (MAC) control element (CE), or
a radio resource control (RRC) message.

9. A method of communications at an apparatus of a network entity, including:
receiving an indication including a single frequency number (SFN) condition from a user equipment (UE);
selecting whether to configure a transmission scheme according to SFN for at least one of a serving transmission and reception point (TRP) and a neighbor TRP associated with the SFN condition; and
communicating with the UE in accordance with the transmission scheme.

10. The method of clause 9, where the SFN condition corresponds to a request not to use SFN based communication, and where selecting whether to configure the transmission scheme according to SFN includes forgoing configuration of the transmission scheme according to SFN based on the request not to use SFN based communication.

11. The method of any preceding clause, where the SFN condition corresponds to a request to use SFN based communication, and where selecting whether to configure the transmission scheme according to SFN includes forgoing configuration of the transmission scheme according to SFN based on the request from the UE to use SFN based communication.

12. The method of any preceding clause, where the SFN condition corresponds to a request to apply a transmission delay, and where selecting whether to configure the transmission scheme according to SFN includes applying the transmission delay to one of the serving TRP or neighbor TRP different for an SFN transmission.

13. The method of any preceding clause, where the indication is received at the serving TRP.

14. The method of any preceding clause, where the indication is received at the neighbor TRP.

15. The method of any preceding clause, where the indication corresponds to one of:
uplink control information (UCI),
a medium access control (MAC) control element (CE), or
a radio resource control (RRC) message.

16. An apparatus for wireless communication, including:
a transceiver;
a memory configured to store instructions; and
at least one processor communicatively coupled with the transceiver and the memory, where the at least one processor is configured to:
obtain a first channel measurement of a first communication channel associated with a serving transmission and reception point (TRP);
obtain a second channel measurement of a second communication channel associated with a neighbor TRP;
select a single frequency network (SFN) condition associated with the first channel measurement or the second channel measurement, where the SFN condition indicates a preference for SFN communication or a modification of an SFN parameter; and
transmit an indication including the SFN condition to one or both of the serving TRP and the neighbor TRP.

17. The apparatus of clause 16, where the at least one processor is further configured to:

monitor a first reference signal of the serving TRP; and
monitor a second reference signal of the neighbor TRP;
where obtaining the first channel measurement includes determining a first channel impulse response based on the first reference signal; and
where obtaining the second channel measurement includes determining a second channel impulse response based on the second reference signal.

18. The apparatus of any preceding clause, where the first reference signal and second reference signal correspond to one of:
   a synchronization signal block (SSB),
   a channel station information (CSI) reference signal (RS), or
   a demodulation reference signal (DMRS).

19. The apparatus of any preceding clause, where to determine the SFN condition, the at least one processor is further configured to:
   identify that a number of channel paths for the first communication channel is equal to a number of channel paths for the second communication channel; and
   determine that the number of channel paths for the first communication channel and the number of channel paths for the second communication channel fall within a threshold range,
   where the indication is transmitted based on identifying that the number of channel paths for the first communication channel is equal to the number of channel paths for the second communication channel and determining that the number of channel paths for the first communication channel and the number of channel paths for the second communication channel fall within the threshold range.

20. The apparatus of any preceding clause, where the preference for SFN communication corresponds to a request for one or both of the serving TRP or the neighbor TRP not to use an SFN based communication.

21. The apparatus of any preceding clause, where the preference for SFN communication corresponds to a request for one or both of the serving TRP or the neighbor TRP to use an SFN based communication.

22. The apparatus of any preceding clause, where the modification of the SFN parameter includes a request for one or both of the serving TRP or the neighbor TRP to apply a transmit delay.

23. The apparatus of any preceding clause, where the indication corresponds to one of:
   uplink control information (UCI),
   a medium access control (MAC) control element (CE), or
   a radio resource control (RRC) message.

24. An apparatus for wireless communication, including:
   a transceiver;
   a memory configured to store instructions; and
   at least one processor communicatively coupled with the transceiver and the memory, where the at least one processor is configured to:
   receive an indication including a single frequency number (SFN) condition from a user equipment (UE);
   select whether to configure a transmission scheme according to SFN for at least one of a serving transmission and reception point (TRP) and a neighbor TRP associated with the SFN condition; and
   communicate with the UE in accordance with the transmission scheme.

25. The apparatus of clause 24, where the SFN condition corresponds to a request not to use SFN based communication, and where to select whether to configure the transmission scheme according to SFN, the at least one processor is further configured to forgo configuration of the transmission scheme according to SFN based on the request not to use SFN based communication.

26. The apparatus of any preceding clause, where the SFN condition corresponds to a request to use SFN based communication, and where to select whether to configure the transmission scheme according to SFN, the at least one processor is further configured to forgo configuration of the transmission scheme according to SFN based on the request from the UE to use SFN based communication.

27. The apparatus of any preceding clause, where the SFN condition corresponds to a request to apply a transmission delay, and where to select whether to configure the transmission scheme according to SFN, the at least one processor is further configured to apply the transmission delay to one of the serving TRP or neighbor TRP different for an SFN transmission.

28. The apparatus of any preceding clause, where the indication is received at the serving TRP.

29. The apparatus of any preceding clause, where the indication is received at the neighbor TRP.

30. The apparatus of any preceding clause, where the indication corresponds to one of:
   uplink control information (UCI),
   a medium access control (MAC) control element (CE), or
   a radio resource control (RRC) message.

In another implementation, an apparatus for wireless communication is provided that includes means for performing the operations of the methods described herein. In yet another implementation, a non-transitory computer-readable medium is provided including code executable by one or more processors to perform the operations of the methods described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the implementations disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, i.e., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more implementations, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of communications at an apparatus of a user equipment (UE), comprising:
   obtaining a first channel measurement of a first communication channel associated with a serving transmission and reception point (TRP);
   obtaining a second channel measurement of a second communication channel associated with a neighbor TRP;
   selecting a single frequency network (SFN) condition associated with the first channel measurement or the second channel measurement, wherein the SFN condition indicates a preference for SFN communication or a modification of an SFN parameter; and
   transmitting an indication including the SFN condition to one or both of the serving TRP and the neighbor TRP.

2. The method of claim 1, further comprising:
   monitoring a first reference signal of the serving TRP; and
   monitoring a second reference signal of the neighbor TRP,
   wherein obtaining the first channel measurement includes determining a first channel impulse response based on the first reference signal; and
   wherein obtaining the second channel measurement includes determining a second channel impulse response based on the second reference signal.

3. The method of claim 2, wherein the first reference signal and second reference signal correspond to one of:
   a synchronization signal block (SSB),
   a channel station information (CSI) reference signal (RS), or
   a demodulation reference signal (DMRS).

4. The method of claim 1, wherein determining the SFN condition includes:
   identifying that a number of channel paths for the first communication channel is equal to a number of channel paths for the second communication channel; and
   determining that the number of channel paths for the first communication channel and the number of channel paths for the second communication channel fall within a threshold range,
   wherein the indication is transmitted based on identifying that the number of channel paths for the first communication channel is equal to the number of channel paths for the second communication channel and determining that the number of channel paths for the first communication channel and the number of channel paths for the second communication channel fall within the threshold range.

5. The method of claim 1, wherein the preference for SFN communication corresponds to a request for one or both of the serving TRP or the neighbor TRP not to use an SFN based communication.

6. The method of claim 1, wherein the preference for SFN communication corresponds to a request for one or both of the serving TRP or the neighbor TRP to use an SFN based communication.

7. The method of claim 1, wherein the modification of the SFN parameter includes a request for one or both of the serving TRP or the neighbor TRP to apply a transmit delay.

8. The method of claim 1, wherein the indication corresponds to one of:
uplink control information (UCI),
a medium access control (MAC) control element (CE), or
a radio resource control (RRC) message.

9. A method of communications at an apparatus of a network entity, comprising:
receiving an indication including a single frequency number (SFN) condition from a user equipment (UE);
selecting whether to configure a transmission scheme according to SFN for at least one of a serving transmission and reception point (TRP) and a neighbor TRP associated with the SFN condition; and
communicating with the UE in accordance with the transmission scheme.

10. The method of claim 9, wherein the SFN condition corresponds to a request not to use SFN based communication, and wherein selecting whether to configure the transmission scheme according to SFN includes forgoing configuration of the transmission scheme according to SFN based on the request not to use SFN based communication.

11. The method of claim 9, wherein the SFN condition corresponds to a request to use SFN based communication, and wherein selecting whether to configure the transmission scheme according to SFN includes forgoing configuration of the transmission scheme according to SFN based on the request from the UE to use SFN based communication.

12. The method of claim 9, wherein the SFN condition corresponds to a request to apply a transmission delay, and wherein selecting whether to configure the transmission scheme according to SFN includes applying the transmission delay to one of the serving TRP or neighbor TRP different for an SFN transmission.

13. The method of claim 9, wherein the indication is received at the serving TRP.

14. The method of claim 9, wherein the indication is received at the neighbor TRP.

15. The method of claim 9, wherein the indication corresponds to one of:
uplink control information (UCI),
a medium access control (MAC) control element (CE), or
a radio resource control (RRC) message.

16. An apparatus for wireless communication, comprising:
a transceiver;
a memory configured to store instructions; and
at least one processor communicatively coupled with the transceiver and the memory, wherein the at least one processor is configured to:
obtain a first channel measurement of a first communication channel associated with a serving transmission and reception point (TRP);
obtain a second channel measurement of a second communication channel associated with a neighbor TRP;
select a single frequency network (SFN) condition associated with the first channel measurement or the second channel measurement, wherein the SFN condition indicates a preference for SFN communication or a modification of an SFN parameter; and
transmit an indication including the SFN condition to one or both of the serving TRP and the neighbor TRP.

17. The apparatus of claim 16, wherein the at least one processor is further configured to:
monitor a first reference signal of the serving TRP; and
monitor a second reference signal of the neighbor TRP,
wherein obtaining the first channel measurement includes determining a first channel impulse response based on the first reference signal; and
wherein obtaining the second channel measurement includes determining a second channel impulse response based on the second reference signal.

18. The apparatus of claim 17, wherein the first reference signal and second reference signal correspond to one of:
a synchronization signal block (SSB),
a channel station information (CSI) reference signal (RS), or
a demodulation reference signal (DMRS).

19. The apparatus of claim 16, wherein to determine the SFN condition, the at least one processor is further configured to:
identify that a number of channel paths for the first communication channel is equal to a number of channel paths for the second communication channel; and
determine that the number of channel paths for the first communication channel and the number of channel paths for the second communication channel fall within a threshold range,
wherein the indication is transmitted based on identifying that the number of channel paths for the first communication channel is equal to the number of channel paths for the second communication channel and determining that the number of channel paths for the first communication channel and the number of channel paths for the second communication channel fall within the threshold range.

20. The apparatus of claim 16, wherein the preference for SFN communication corresponds to a request for one or both of the serving TRP or the neighbor TRP not to use an SFN based communication.

21. The apparatus of claim 16, wherein the preference for SFN communication corresponds to a request for one or both of the serving TRP or the neighbor TRP to use an SFN based communication.

22. The apparatus of claim 16, wherein the modification of the SFN parameter includes a request for one or both of the serving TRP or the neighbor TRP to apply a transmit delay.

23. The apparatus of claim 16, wherein the indication corresponds to one of:
uplink control information (UCI),
a medium access control (MAC) control element (CE), or
a radio resource control (RRC) message.

24. An apparatus for wireless communication, comprising:
a transceiver;
a memory configured to store instructions; and at least one processor communicatively coupled with the transceiver and the memory, wherein the at least one processor is configured to:
  receive an indication including a single frequency number (SFN) condition from a user equipment (UE);
  select whether to configure a transmission scheme according to SFN for at least one of a serving transmission and reception point (TRP) and a neighbor TRP based on the SFN condition; and
  communicate with the UE in accordance with the transmission scheme.

25. The apparatus of claim 24, wherein the SFN condition corresponds to a request not to use SFN based communication, and wherein to select whether to configure the transmission scheme according to SFN, the at least one processor is further configured to forgo configuration of the transmission scheme according to SFN based on the request not to use SFN based communication.

26. The apparatus of claim 24, wherein the SFN condition corresponds to a request to use SFN based communication, and wherein to select whether to configure the transmission scheme according to SFN, the at least one processor is further configured to forgo configuration of the transmission scheme according to SFN based on the request from the UE to use SFN based communication.

27. The apparatus of claim 24, wherein the SFN condition corresponds to a request to apply a transmission delay, and wherein to select whether to configure the transmission scheme according to SFN, the at least one processor is further configured to apply the transmission delay to one of the serving TRP or neighbor TRP different for an SFN transmission.

28. The apparatus of claim 24, wherein the indication is received at the serving TRP.

29. The apparatus of claim 24, wherein the indication is received at the neighbor TRP.

30. The apparatus of claim 24, wherein the indication corresponds to one of:
  uplink control information (UCI),
  a medium access control (MAC) control element (CE), or
  a radio resource control (RRC) message.

* * * * *